Figure 1:
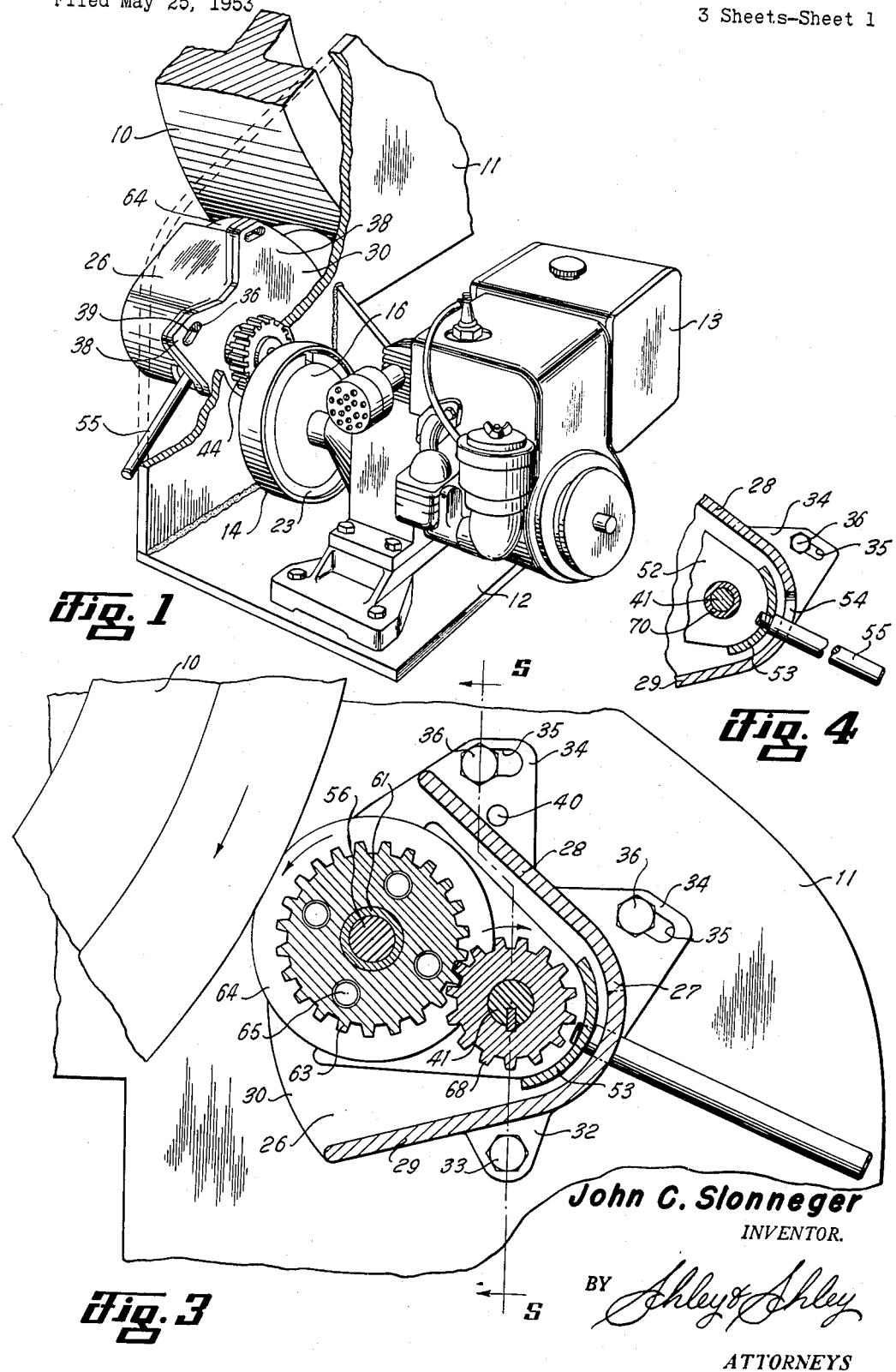

Dec. 6, 1955

J. C. SLONNEGER 2,725,751

ENGINE STARTER

Filed May 25, 1953

3 Sheets-Sheet 1

John C. Slonneger
INVENTOR.

BY Ashley & Ashley

ATTORNEYS

Dec. 6, 1955

J. C. SLONNEGER 2,725,751

ENGINE STARTER

Filed May 25, 1953

3 Sheets-Sheet 2

John C. Slonneger
INVENTOR.

BY Ashley & Ashley

ATTORNEYS

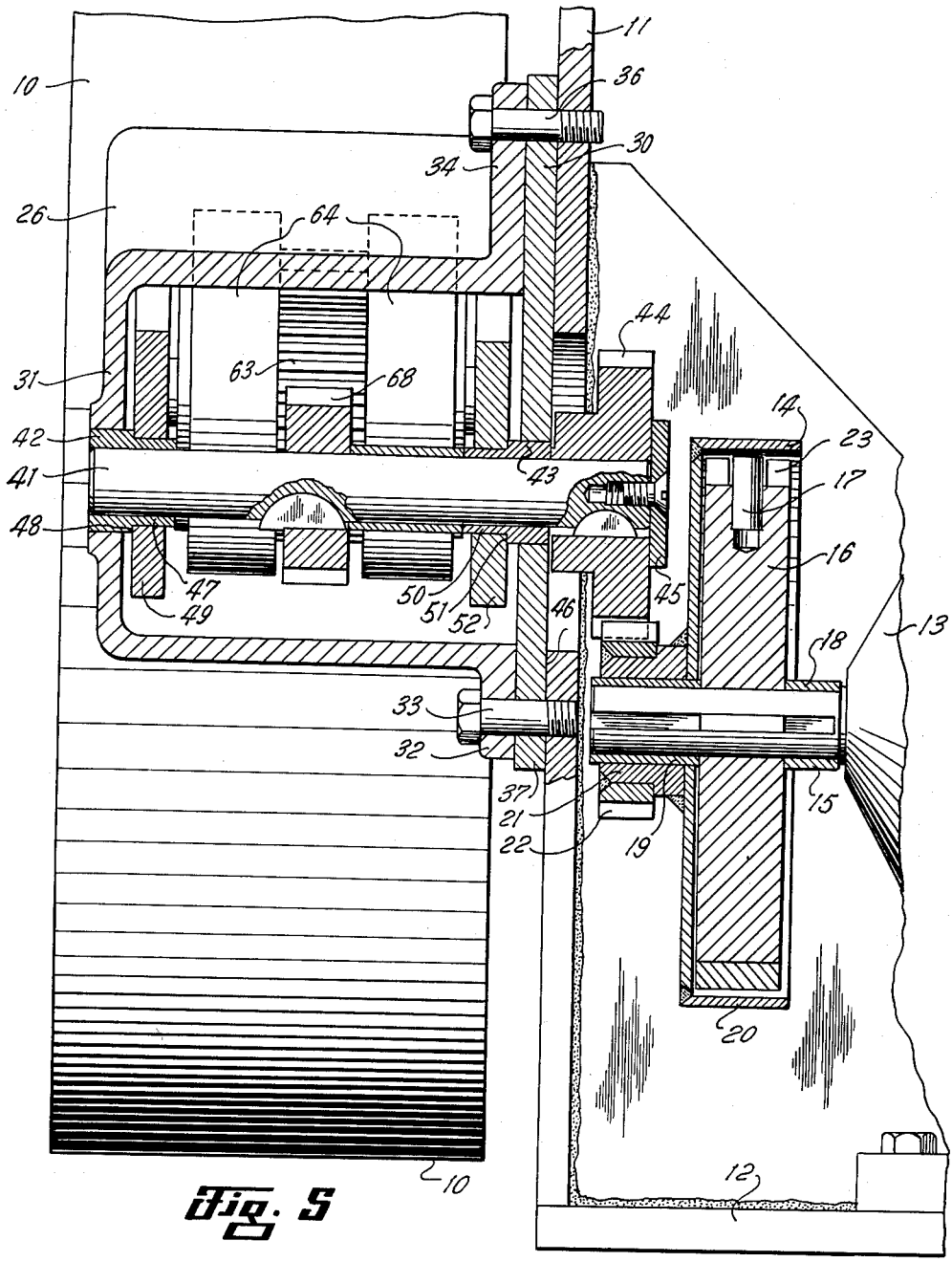

United States Patent Office 2,725,751
Patented Dec. 6, 1955

2,725,751
ENGINE STARTER

John C. Slonneger, Dallas, Tex., assignor to The Continental Supply Company, Dallas, Tex., a corporation of Delaware Application May 25, 1953, Serial No. 357,139

9 Claims. (Cl. 74—8)

This invention relates to new and useful improvements in engine starters.

The invention is particularly concerned with starters for stationary engines having flywheels with exposed rims, and especially, one or two cylinder horizontal engines. Nevertheless, the invention is applicable to starters utilized with other types of engines, and the invention is not to be limited to the foregoing.

In the past, in conjunction with the starting of internal combustion engines having flywheels with exposed rims, it has been conventional to employ an electric starting motor or a small internal combustion engine as a source of starting power or torque and to deliver the rotative force of such starting motor or engine to the periphery of the flywheel rim by suitable friction wheels. So far as known, however, such arrangements have resulted in excessive wear of the friction wheels, which normally are formed of rubber or some similar material, the degree of force with which the friction wheels are engaged with the flywheel has depended to a large extent upon the degree of manual force with which the wheels are engaged, there has resulted a tendency to engage the friction wheels with either too great or too little force, and the operator has seldom been able to disengage the friction wheels instantaneously after the main engine has started. Necessarily, as a result of the last shortcoming, the over-speeding of the main engine flywheel as the main engine starts, has resulted in considerable wear upon the friction wheels, and further, has subjected the starting motor or engine to a considerable likelihood of damage due to over-speeding.

The present invention has, therefore, as a particular object the provision of a starter for internal combustion engines which may be driven by a small motor or engine, and in which friction wheels are brought into positive and predetermined pressural contact with the periphery of a flywheel, and held so engaged until adequate starting torque is supplied to the main engine, and are then promptly released from engagement with the flywheel in order that excessive wear and potential damage to the starting engine or motor may be avoided.

An additional object of the invention is to provide an improved starter for internal combustion engines, the starter being adapted to be driven by a motor or engine and to revolve friction wheels engaging the main engine flywheel, provision being made for engaging the friction wheels with the main engine flywheel prior to energization or starting of the starter motor or engine whereby excessive wear of the friction wheels in bringing them into engagement with the flywheel while in motion is eliminated, and whereby the shock of the reactive torque incident to such engagement is eliminated.

An additional object of the invention is to provide an improved starter of the character described in which provision is made for predetermining and/or adjusting the force or pressure with which the friction wheel is brought into engagement with the main engine flywheel whereby an adequate starting torque is transmitted without undue loading of the starting motor or engine and without undue stress upon the friction wheel, and wherein the starter is held in engagement until the main engine starts.

A particular object of the invention is to provide a starter for internal combustion engines wherein a small internal combustion engine is used as a source of starting torque, the starter including in combination a centrifugal clutch permitting the starting engine to attain a rotative speed sufficient to insure the deliverance of ample starting torque prior to the time of engagement of the clutch and transmission of the torque to the main engine flywheel or crankshaft.

A further object of the invention is to provide an improved starter for internal combustion engines which is simple in structure and economical to manufacture and which eliminates to a large degree, if not entirely, the likelihood of improper use or manipulation by the operator.

An important object of the invention is to provide an improved starter for internal combustion engines of the type wherein friction driving wheels engage the exposed periphery of the main engine flywheel in order to impart the starting torque thereto, the starter being adapted for engagement of its friction wheel with the engine flywheel prior to starting of the driving engine or motor but having provision for effecting such engagement subsequent to starting of the engine or motor, and in which the friction wheels are automatically disengaged from the flywheel when the main engine has been started and is picking up speed. In particular, the starter makes provision for avoiding stalling of the small starting engine, if such is used as the source of power or starting torque.

A construction designed to carry out the invention will be hereinafter described together with other features of the invention.

Figure 2:
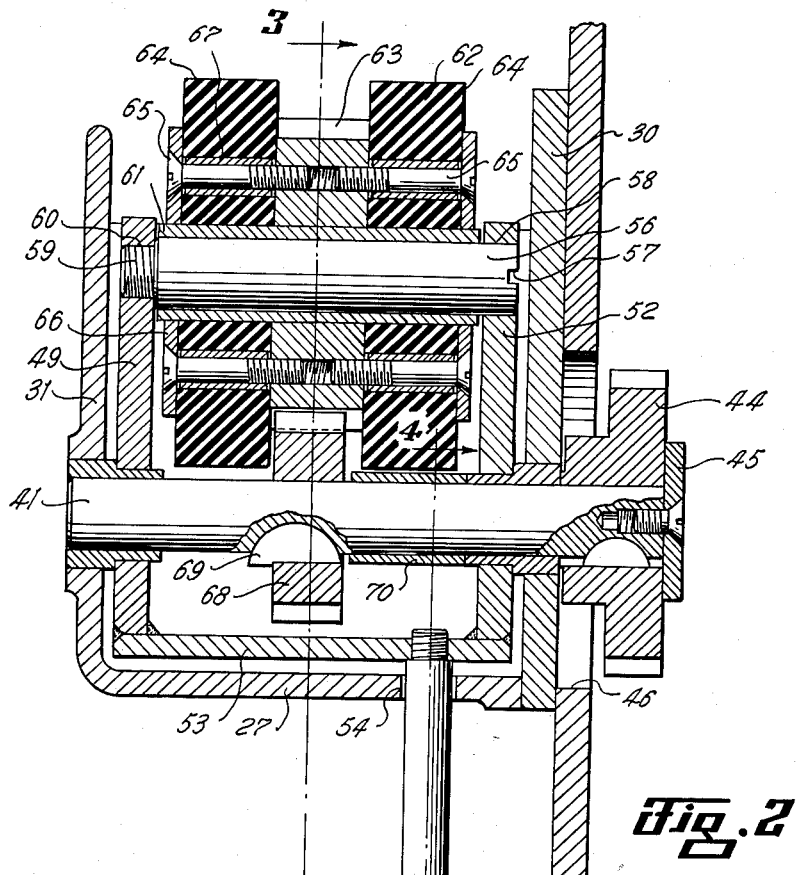
Figure 6:
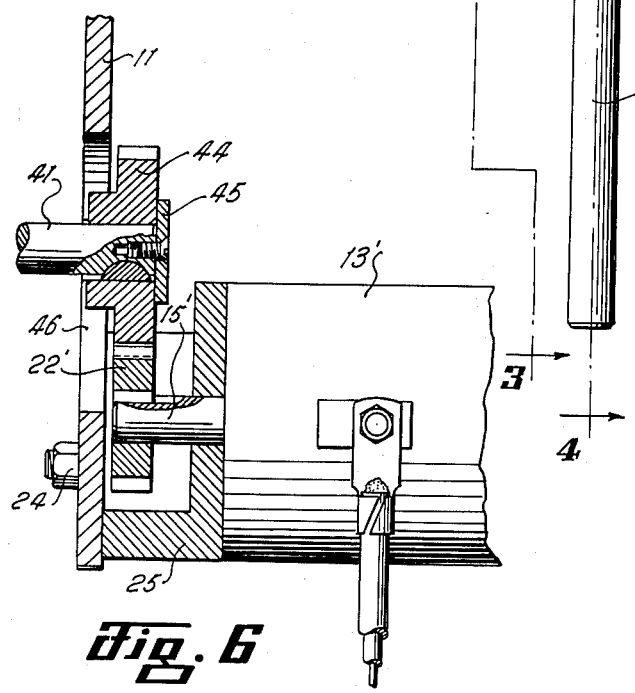

The invention will be more readily understood from a reading of the following specification and by reference to the accompanying drawings, wherein examples of the invention are shown, and wherein:

Fig. 1 is a perspective view, partially broken away, illustrating a starter constructed in accordance with this invention, the view showing a fragment of the main engine flywheel, and showing only a portion of the supporting member for the starter, Fig. 2 is an enlarged, horizontal, cross-sectional view through the friction wheel assembly of the starter, Fig. 3 is a vertical, transverse, sectional view taken upon the line 3—3 of Fig. 2, Fig. 4 is a fragmentary, vertical, transverse, sectional view taken upon the line 4—4 of Fig. 2 and being illustrated upon a reduced scale, Fig. 5 is a vertical, cross-sectional view taken upon the line 5—5 of Fig. 3, and Fig. 6 is a horizontal, cross-sectional view of the driving portion of the starter and showing a modification of the invention.

In the drawings, the numeral 10 designates the flywheel of an internal combustion engine. Since the present invention is adapted especially for use with one or two cylinder horizontal engines having relatively heavy, exposed flywheels with wide flat peripheral rims, a flywheel of this type has been illustrated. It is to be kept in mind, however, that the invention is not limited to a starter for use with engines of this type but may advantageously be applied to any engine having an exposed rotative surface connected to the engine crankshaft and into engagement with which the driving friction wheel of this invention mey be brought. A preferred form of the invention is illustrated in the drawings, but it is quite apparent that this particular embodiment may readily be adapted for use with other types of engines.

In order to support the starter structure, a vertical bracket plate 11 is suitably secured to the engine frame or engine foundation (neither illustrated) or any other suitable support, and is disposed parallel to and adjacent the flywheel 10. The bracket plate 11 projects beyond the periphery of the flywheel and carries a horizontally extending supporting platform 12 extending laterally from the side of the plate 11 opposite to the flywheel 10. For compactness and in order to minimize obstruction of the other parts of the main engine, the platform 12 is desirably positioned in a horizontal plane below the center of the flywheel 10 and may be closely adjacent the plane of the base of the main engine.

A suitable starting motor or engine 13 is mounted upon the platform, a small single cylinder internal combustion engine having been found most suitable for this purpose. As illustrated in Fig. 6, however, an electric starting motor 13' may be employed. The motor 13 is operatively connected to a clutch 14 through its drive shaft 15, the clutch being of any suitable type, but desirably being a centrifugal clutch as disclosed in my co-pending application, Serial No. 370,276, filed July 27, 1953. In general, the clutch includes a central disk 16 keyed upon the shaft 15 and having a radially extending drive pin 17. A spacer sleeve 18 received upon the inner end of the shaft 15 separates the disk 16 from the motor 13, and a bearing bushing 19 is pressed or otherwise secured upon the outer end of the shaft 15 which projects beyond the disk 16. A clutch drum 20 surrounds the disk 16 and is formed with an axial hub 21 rotatably received upon the bushing 19. A drive gear or pinion 22 is secured upon the hub 21. For effecting a driving connection between the disk 16 and the drum 20, an annular friction shoe 23 is positioned between the disk and the inner periphery of the drum, the friction shoe comprising an annular split ring frictionally engaging the outer periphery of the disk 16 and having the driving pin 17 projecting between the split or cut ends of the ring whereby rotative torque is transmitted from the disk 16 to the shoe 23 by means of the pin 17.

With this arrangement, the engine 13 may be started and brought up to speed before the clutch 14 engages. At a predetermined rotational speed, centrifugal force will be sufficient to expand the shoe 23 outwardly into frictional engagement with the inner periphery of the drum 20 so as to engage the clutch and transmit rotative torque to the drum 20 and the drive pinion 22. Obviously, any suitable type of clutch may be employed, the particular clutch illustrated having been found quite advantageous for use in this starter in that it is automatic in operation and insures that the starting engine 13 will not be loaded until it has reached adequate operating speed.

In the event the electric motor 13' of Fig. 6 is employed, no clutch is necessary or desirable, and the drive pinion 22' may be mounted directly upon the shaft 15' of the electric motor. This is true because electric motors of the type used for starting engines produce a high shaft torque at zero speed, and hence, the motor 13' does not need to be brought up to speed before being subjected to a load. The motor 13' may be carried by and supported from the plate 11 in any suitable fashion as by the bolt 24 extending through the plate 11 and securing thereto a mounting bracket 25 to which the motor is connected.

The starter structure is enclosed in a housing 26 secured to the bracket 11 upon the side thereof facing the flywheel 10 in substantially radial alinement with the flywheel 10. The housing has a curved front wall 27, divergent upper and lower walls 28 and 29, respectively, and an open rearward wall facing the flywheel. The side of the housing adjacent the plate 11 is also open, and a bearing-supporting plate 30 is positioned between the plate 11 and the housing 26. The outer side wall 31 of the housing is closed, and is of generally triangular shape so as to merge smoothly into the divergent upper and lower walls 28 and 29.

For rotatably and adjustably supporting the housing 26 upon the plate 11, an ear 32 projects downwardly from the lower wall 29 and is pivotally mounted upon a bolt 33 extending through the ear and the plate 30, and being threaded into the plate 11 in axial alinement with the drive shaft 15 of the motor 13. The housing is also provided with a pair of ears 34 extending generally upwardly from the upper wall 28 and having slots 35 through which bolts 36 extend. The bolts 36 are threaded into the plate 11, and it is apparent that by loosening the bolts 36, the housing may be pivoted in a vertical plane about the bolt 33 as an axis. When pivoted to a desired position, the housing may be clamped in place by tightening of the bolts 36.

The plate 30 is also provided with a downwardly extending ear 37 and upwardly extending ears 38, the ears registering with the ears of the housing, and the upper ears 38 having slots 39 registering with the slots 35 of the upper housing ears. The bolt 33 prevents shifting of the lower portion of the plate 30 with respect to the housing 26, and a dowel pin 40 (Fig. 3) extends through one pair of the upper registering ears 34 and 38 in order to prevent lateral shifting of the upper portion of the plate 30 with respect to the housing. Thus, the composite structure of the plate 30 and the housing 26 may be shifted as a unit and pivoted about the bolt 33 so as to be brought into any desired angular position. Obviously, swinging of the housing in a vertical plane about the bolt 33 causes the housing to move toward or away from the periphery of the flywheel 10.

A transverse shaft 41 has its outer end journaled in the outer wall 31 of the housing 26 upon a suitable bearing bushing 42 positioned in said outer wall, the inner end of the shaft projecting through the plate 30 and being rotatably supported therein upon a bearing bushing 43 similar to the bushing 42 and mounted in the plate 30. A driven gear or pinion 44 is keyed upon the inner end of the shaft and engages the pinion 22. A removable washer 45 is secured to the inner end of the shaft 41 and holds the pinion 44 in place thereon. In order that the entire starter structure may be removed from the plate 11 by disconnection of the bolts 33 and 36, the plate 11 is provided with a large opening 46 through which the shaft 41 extends and being of sufficient diameter as to permit the passage of the pinion 44 therethrough.

The bearing bushing 42 projects inwardly into the housing 46 from the outer wall 41 and has its inner portion 47 reduced to form a shoulder 48. An approximately triangular cheek plate 49 is rotatably mounted upon the portion 47 of the bushing 42 and projects therefrom toward the open rearward end of the housing 26. The bushing 43 similarly has its inner end 50 reduced in diameter to form a shoulder 51, and a cheek plate 52, similar to the plate 49, is rotatably mounted upon the reduced portion 50 and projects toward the open rearward side of the housing 26 in transverse alinement with the cheek plate 49. A semi-cylindrical yoke 53 extends between and joins the forward ends of the cheek plates 49 and 52 and is positioned in close proximity to the curved forward wall 27 of the housing 26. The forward wall has therein a vertical slot 54 through which an actuating handle 55 extends, the handle being threaded into the yoke 53 in order that vertical swinging of the cheek plates may be effected. Vertical swinging of the handle 55 within the slot 54 obviously will cause the cheek plates to swing in a vertical arc about the shaft 41 as an axis.

A gudgeon or axle 56 extends between the rearward ends of the cheek plates 49 and 52 parallel to the shaft 41. The end of the axle 56 adjacent the plate 30 carries a transverse slot 57 and is slidably and rotatably received within an opening 58 formed in the rearward end of the cheek plate 52. The outer end of the axle 56 is reduced in diameter and screw-threaded for reception in a screw-threaded opening 60 provided in the rearward end of the cheek plate 49 whereby the axle is securely positioned between the cheek plates and supported thereby.

An elongate bushing 61 is rotatable upon the axle 56 and extends between the cheek plates for supporting a starter wheel or friction wheel assembly 62 upon the axle 56. The friction wheel assembly includes a driven gear 63 having starter wheels or friction disks 64 clamped to both sides thereof by suitable bolts 65. As shown in Fig. 2, the bolts 65 extend through clamping plates 66 which abut the outer faces of the disk 64, and spaced sleeves 67 are provided upon each of the bolts and extend between the clamping plates and the gear in order that the friction disks may be protected against distortion by excessive tightening of the bolts. Desirably, the disks 64 are formed of rubber or a rubber-like material, or of any other suitable material which is distortable in nature and has a high coefficient of friction. The friction disks being rigidly clamped and connected to the gear 63 by means of the bolts and clamping plates, are adapted to be driven by the gear and to transmit rotative torque to the periphery of the engine flywheel.

It is noted that the disks 64 are of somewhat larger diameter than the gear 63 whereby an annular space or recess is provided around the gear 63 between the outer portions of the disks 64. A driving gear 68 is keyed upon the shaft 41 and extends between the outer marginal portions of the disks 64 into engagement with the gear 63 for driving the same. Rotative torque thus is transmitted from the pinion 22 to the pinion 44 and through the shaft 41 and the gear 68 to the gear 63 and the friction disks 64. Since the friction wheel assembly is carried upon the cheek plates 49 and 52 and may be swung in a vertical arc with the cheek plates about the shaft 41, the concentric mounting of the gear 68 and the cheek plates upon the shaft 41 maintains the relative spacing between the gears 63 and 68 regardless of the angular position of the friction wheel assembly and hence permits the vertical swinging of the assembly without interference with the power drive thereto. Similarly, the mounting of the starter structure for pivotal movement in a vertical arc about the bolt 33 and the axial alinement of the bolt 33 with the shaft 15, permits swinging of the entire structure in a vertical arc about the bolt 33 without altering the driving engagement between the pinions 22 and 44. As the starter structure is pivoted, the pinion 44 is simply moved in a concentric path around the pinion 22, and the proper driving relationship is thus maintained regardless of movement or adjustment of the starter structure or the friction wheel assembly.

When not in use, the starter structure is placed in a non-operating position by upward swinging of the handle 55 which swings the friction wheel assembly downwardly within the housing 26 and out of engagement with the periphery of the flywheel 10. When, however, the main engine is not running and it is desired to start the same, the handle 55 is swung downwardly in the notch 54 which moves the starter or friction wheels upwardly in a vertical arc into engagement with the flywheel. At this stage, the center of the axle 56 and, hence, the point of tangency of the friction wheels with the flywheel is preferably slightly above the plane extending through the axes of the shaft 41 and the flywheel whereby a toggle action is achieved to hold the friction wheel structure in this position against possible unsteady operation of the starting engine. Engagement of the handle 55 with the bottom of the slot 54 prevents further upward swinging of the friction wheel structure.

The small starting engine 13 is now started, as by hand-cranking, the starting being facilitated by the absence of any load on the starting engine. When the engine 13 has come up to a speed adequate for carrying the starting load (the speed at which the clutch 14 automatically engages) rotative power is transmitted from the engine through the clutch and the pinions 22 and 44 to the shaft 41. This revolves the gear 68 in a clockwise direction, as viewed in Fig. 3, and hence drives the friction wheels counter-clockwise causing the flywheel 10 to be driven properly in a clockwise direction for applying a starting torque to the engine. The reactive force upon the starter structure tends to swing the friction wheel assembly further upwardly and hence prevents disengagement of the friction wheels from the flywheel periphery due to the transmitted force. In the particular embodiment shown, the speed ratio between the engine crankshaft and the friction wheel assembly is about 1 to 22½. Hence, when the main engine starts, the much greater peripheral speed of the flywheel will cause the friction wheel assembly to be swung downwardly, disengaging the friction wheels from the flywheel and preventing damage thereto. The device will operate indefinitely and will continue to revolve the flywheel 10 until the main engine is started. Once the engine is started, the starter is automatically disengaged and thrown into a non-operative position. In the modification shown in Fig. 6, the same procedure is followed except that no clutch is required. The assembly shown in Fig. 2 is employed in this modification, the pinion 44 meshing with the pinion 22', and the operation and advantages being identical.

The degree of force with which the friction wheels bear against the flywheel is readily adjusted by pivoting of the entire starter structure about the bolt 33 and the clamping of the structure into its adjusted position by tightening of the bolts 36. Although very little wear of the friction wheel 64 is encountered, such wear as may occur may be compensated for through this pivotal adjustment.

It is to be noted that the friction wheels are not brought into engagement with the flywheel while revolving and hence that the friction wheels are not subjected to the shock and abrasion of such an operation. Nevertheless, such procedure may be followed in starting the engine, the starting engine being placed in operation and the friction wheels revolved before the friction wheel assembly is swung upwardly. The latter has only the drawback that additional wear of the friction wheels is caused.

While it is desirable, of course, that the main engine have a compression relieving starting arrangement in order that the flywheel be placed more readily in motion, such arrangement is not essential, and the starter is quite readily employed upon any engine regardless of whether the engine has a compression relieving starting arrangement or not.

As pointed out hereinbefore, the entire starter structure is readily removed by simple disconnection of the bolts 33 and 36, the pinion 44 being slipped from engagement with the pinion 22 and passed through the large opening 46. Removal of the plate 45 permits removal of the pinion 44 and the plate 30 and complete disassembly of the structure by lateral withdrawal of the shaft 41 and removal of the cheek plate and friction disk structure through the rearward open end of the housing 46. Simple unscrewing of the axle or gudgeon 56 then completes the disassembly of the structure. While the shaft 41 may be held against endwise movement in any suitable fashion and the gear 68 may be secured thereon as may be desired, it is preferred to hold the gear against outward movement on the shaft through utilization of a stepped key 69, as shown in Fig. 2. Both the gear 68 and the shaft 41 may be held against excessive inward movement toward the starting engine by the positioning of a tubular sleeve 70 upon the shaft between the gear 68 and the inner bearing bushing 43.

As pointed out hereinbefore, air motors, hydraulic motors, or any other suitable source of motive power may be employed for driving the pinion 44 and supplying the power to impart starting rotation to the main engine.

It is further quite apparent that other driving connections to the engine may be utilized in place of the friction wheel engagement with the flywheel rim. While less desirable from several aspects, a driving gear or cog could be used to engage a toothed flywheel, and the teeth on the flywheel might be internal or external. Thus, the starter wheel or wheels, while preferably of a friction type, may be of other suitable designs.

The foregoing description of the invention is explanatory thereof and various changes in the size, shape and materials, as well as in the details of the illustrated construction may be made, within the scope of the appended claims, without department from the spirit of the invention.

What I claim and desire to secure by Letters Patent is:

1. An engine starter for internal combustion engines including, a supporting bracket, a source of rotative power carried by the bracket, a driven shaft, a driving connection between the shaft and the source of rotative power having a rotary driving element driven by said source, a housing in which the shaft is rotatably supported, said housing being pivotally mounted on the bracket for pivoting about an axis alined axially with the rotary driving element, a support rotatable on the shaft, a starter wheel assembly carried by the support offset from the shaft and having a rotatable starter wheel, a driving connection between the shaft and the starter wheel, and means for swinging the support and the starter wheel assembly in a concentric path about the shaft.

2. An engine starter including, a supporting member, a source of rotative starting torque carried by the member, a rotary driving element driven by said source, a starter structure pivotally mounted on the member for swinging in an arc about the axis of the driving element, means for securing the structure in adjusted positions in said arc, a driven shaft carried by the starter structure, a driving connection between the driving element and the shaft, a friction wheel assembly rotatable on the shaft and having a rotatable friction wheel offset from the shaft, a driving connection between the wheel and the shaft, and means for swinging the friction wheel assembly in a concentric path around the shaft.

3. An engine starter as set forth in claim 2, and a centrifugal clutch between the source of starting torque and the rotary driving element.

4. An engine starter as set forth in claim 2, and stop means for limiting swinging of the friction wheel assembly in reaction to torque delivered by the friction wheel.

5. The combination with an internal combustion engine having a flywheel with a peripheral surface, of an engine starter including, shaft-supporting bushings, a driven shaft rotatably mounted in said bushings, means for driving said shaft, a support rotatably carried by the bushings, a friction wheel assembly carried by the support offset from the shaft and having a rotatable friction wheel, a driving connection between the shaft and the friction wheel, and means for swinging the support and the friction wheel assembly in a concentric path about the shaft, swinging of the friction wheel assembly engaging the friction wheel with the periphery of the engine flywheel, and the axis of the shaft and the friction wheel and the flywheel being substantially parallel and approximately alined in one plane when the friction wheel is so engaged.

6. The combination as set forth in claim 5, and stop means limiting swinging of the friction wheel assembly and the axis of the friction wheel to a point slightly past the plane of alinement between the shaft and flywheel axes.

7. In combination with an internal combustion engine having a flywheel with a horizontal axis, of an engine starter including, shaft-supporting bushings, a driven shaft rotatably mounted in said bushings, means for driving said shaft, a support rotatably carried by the bushings, a friction wheel assembly carried by the support offset from the shaft and having a rotatable friction wheel having a horizontal axis, a driving connection between the shaft and the friction wheel, and means for swinging the support and the friction wheel assembly in a vertical concentric path about the shaft, the support and friction wheel assembly being so positioned on the shaft that swinging of the friction wheel opposite to the direction of rotation of the flywheel engages the friction wheel with the flywheel, and opposite swinging of the friction wheel disengages the latter from the flywheel.

8. An engine starter including, a supporting plate, a starting engine carried by the plate, a driving pinion driven by the starting engine, a centrifugal clutch between the driving pinion and the starting engine, a pinion driven by the driving pinion, the supporting plate having an opening therein of sufficient size as to permit the driven pinion to pass therethrough, a starter structure carried by the plate, a shaft in the starter structure extending through the plate opening and carrying the driven pinion, a friction wheel assembly rotatably carried on the shaft and having rotatable friction wheels positioned eccentrically of the shaft, and a driving connection between the friction wheels and the shaft.

9. An engine starter including, a supporting member, a source of rotative power carried by the member, a rotary driving element driven by said source, a starter structure housing pivotally mounted on the member for swinging in an arc about the axis of the driving element, means for securing the housing in adjusted positions in said arc, bushings carried by the housing, a starter unit pivotally mounted in the housing upon the bushings, a driven shaft in the starter unit rotatably mounted in said bushings and rotatable independently of the starter unit, a driving connection between the rotary driving element and the shaft, a friction wheel assembly carried by the starter unit and having a rotatable friction wheel offset from the shaft, a driving connection between the friction wheel and the shaft, and means for swinging the starter unit and the friction wheel assembly in a concentric path around the shaft.

References Cited in the file of this patent

UNITED STATES PATENTS

| Number | Name | Date |
|---|---|---|
| 1,009,276 | Boyle | Nov. 21, 1911 |
| 1,184,866 | Nikonow | May 30, 1916 |
| 1,259,829 | Brown | Mar. 19, 1918 |
| 1,828,369 | Hodges | Oct. 20, 1931 |
| 1,852,612 | Hodges | Apr. 5, 1932 |
| 2,151,042 | McGrath | Mar. 21, 1939 |